March 20, 1951 — H. P. ROTH — 2,545,707
OXYGEN DEMAND PRESSURE BREATHING REGULATOR
Filed Sept. 4, 1944 — 2 Sheets-Sheet 1

Inventor
HERMAN P. ROTH
By
Attorney

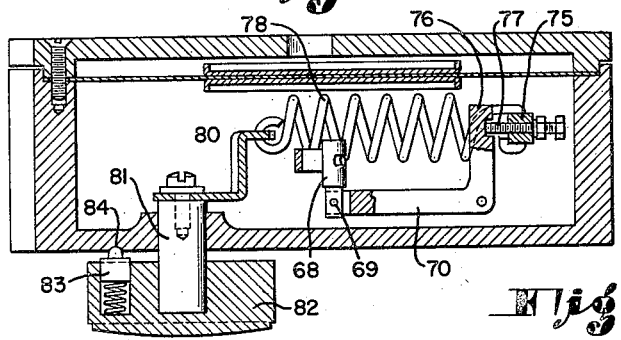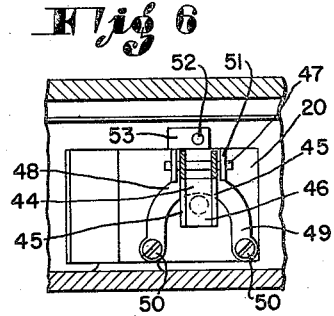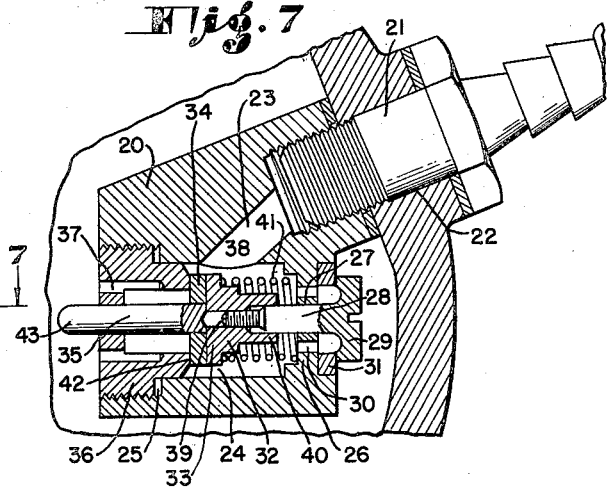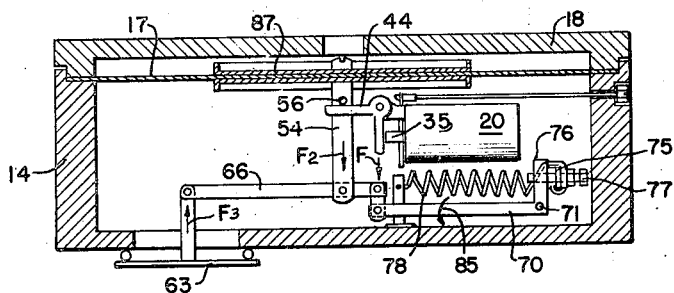

Patented Mar. 20, 1951

2,545,707

UNITED STATES PATENT OFFICE 2,545,707

OXYGEN DEMAND PRESSURE BREATHING REGULATOR

Herman P. Roth, Inglewood, Calif., assignor to The Garrett Corporation, Los Angeles, Calif., a corporation of California Application September 4, 1944, Serial No. 552,631

15 Claims. (Cl. 137—153)

My invention relates to means for supplying oxygen to aviators at high altitudes and relates in particular to an improved type of regulator for the supply of oxygen to meet the respirational requirements of humans at high altitudes.

Authorities on aviation physiology recognize that bodily functioning for safe flight is assured only when the partial pressure of oxygen in the lungs is equal to or exceeds certain average minimal limits. If the atmosphere, which contains approximately 21% oxygen, is the sole source of oxygen, the reduction in pressure with increasing altitude decreases the partial pressure of oxygen in the lungs to minimum safe limits (allowing a reasonable safety factor) at altitudes from 10,000 to 12,000 feet, as now generally recognized. Above these altitudes, the mixture of a progressively increasing percentage of oxygen in the respired air is required to assure normal physiological functioning, until at approximately 30,000 feet it is necessary to breathe an atmosphere consisting of practically pure oxygen to provide the partial pressure of oxygen required.

With further increase in altitude, the normally desirable margin of safety is narrowed and the likelihood of dangerous physiological impairment increases, until at altitudes in the vicinity of 40,000 feet serious impairment of faculties exists in varying degree for various individuals and is accentuated by even minimal physical activity. It then becomes necessary, if higher altitudes are to be reached safely, to maintain or if possible increase the partial pressure of oxygen in the lungs, either by providing a pressurized compartment for the personnel, or by creating a pressure within the lungs which is higher than that surrounding the body. Devices to perform the latter function have been proposed and developed, and it is the purpose of the invention herein described to present one of improved design and construction, having certain unique principles which will be described.

Previous devices of which I have knowledge designed to provide respiration of oxygen with increased intra-pulmonary pressures have exhibited several defects or disadvantages. A typical device employs a chamber which communicates by a breathing connection of suitable bore to a mask worn by the user, and to which is connected a source of oxygen. The chamber is provided with a diaphragm or other pressure-sensitive device suitably connected to a valve governing the oxygen inflow, so that when the user inhales, the pressure within the chamber is slightly reduced, the diaphragm causes the oxygen inlet to open, and oxygen flows through the chamber and breathing connection in a volume sufficient to meet the user's requirements. At the end of inhalation the pressure within the chamber rises, the diaphragm causes the oxygen inlet to close, and as exhalation begins, an outlet valve in one wall of the chamber opens and remains open until exhalation ends, then closes and succeeding respiration cycle begins.

In order to provide average intra-pulmonary pressures higher than atmospheric, it is customary to provide variable loading for the diaphragm and for the exhalation valve, generally by springs. These previous devices usually employ two springs, one to load the diaphragm and one to load the exhalation valve. This has correspondingly complicated the mechanical construction, and has further entailed the difficulty of coordinating the action of the two springs.

It is an object of the present invention to provide an oxygen demand regulator which will assure consistent ease of breathing, and proper balance between inhalational and exhalational pressure differentials throughout the range of increased intra-pulmonary pressure adjustment which the regulator provides.

It is also an object of the invention to provide an oxygen demand regulator capable of satisfying emergency oxygen inflow demands, without undue inhalational pressure differentials or leakage during the exhalation.

It is also an object in a device of this character to render inhalational effort and the rate of oxygen inflow relatively independent of the oxygen supply pressure within its usual limits of variation.

A further object of the invention is to prevent undesirable surges in the oxygen supply at the moment the inlet valve opens, and to prevent an unduly high ratio for the effort to open the exhalation valve with respect to the pressure required to hold it open.

It is an object of the invention to provide an oxygen demand device having an oxygen inlet valve which is controlled by a diaphragm and an exhalation valve, both of these valves being controlled by a single manual adjustment, and to provide a device of this character wherein the spring loading of the diaphragm and the exhalation valve is proportioned so as to at all times provide for an exhalation pressure only slightly greater than the inhalation pressure and proportionate thereto.

A further object of the invention is to provide a device of this character wherein a single spring means acts through a leverage system to apply proportional pressures to the diaphragm and the exhalation valve substantially in inverse ratio to the areas of the diaphragm and exhalation valve, thereby coordinating the action of the diaphragm and the exhalation valve throughout the range of adjustment of the device.

A further object is to provide an oxygen demand regulator having a balanced oxygen inlet valve which is controlled by a diaphragm. In the device the oxygen control is sensitive to small changes in pressure and therefore surging of the oxygen flow is substantially eliminated. Owing to the sensitivity of the arrangement, there is at no time during the normal use of the device any possible restriction of the supply of oxygen to the user, which restriction of supply might produce physiological effects or apprehension, and in the use of the device, the possibility of emotional disturbance is minimized owing to elimination of those factors which may tend to produce emotional disturbance at times when full use of the faculties are needed for activities of major importance.

Further objects and advantages of the invention will be brought out in the following part of the specification.

Referring to the drawings which are for illustrative purposes only,

Fig. 4 is a sectional view taken as indicated by the line 4—4 of Fig. 2.

Fig. 5 is a fragmentary sectional view taken as indicated by the line 5—5 of Fig. 2.

Fig. 6 is a fragmentary sectional view taken as indicated by the line 6—6 of Fig. 5.

Fig. 7 is an enlarged fragmentary sectional view taken as indicated by the line 7—7 of Fig. 5.

Fig. 8 is a schematic sectional view to show in a simple manner the cooperative relation of the operating parts of the regulator.

Figure 1:
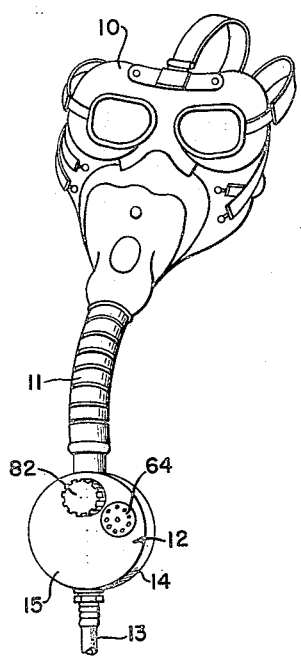
Fig. 1 is a view showing a preferred embodiment of my invention connected to a mask.

In Fig. 1 I have shown a head gear or mask 10 connected by means of a breathing tube 11 with an oxygen demand regulator 12 which is in turn connected through an oxygen supply tube 13 with a source of oxygen under pressure, such as an oxygen bottle, not shown.

The regulator 12 has a casing 14 having a front wall 15 and a cylindric side wall 16 against the end face 7 of which a diaphragm 17 is clamped by means of a cover 18 having an opening 19 therein through which the variations in atmospheric pressure may be transmitted to the outer face of the diaphragm 17.

Figure 2:
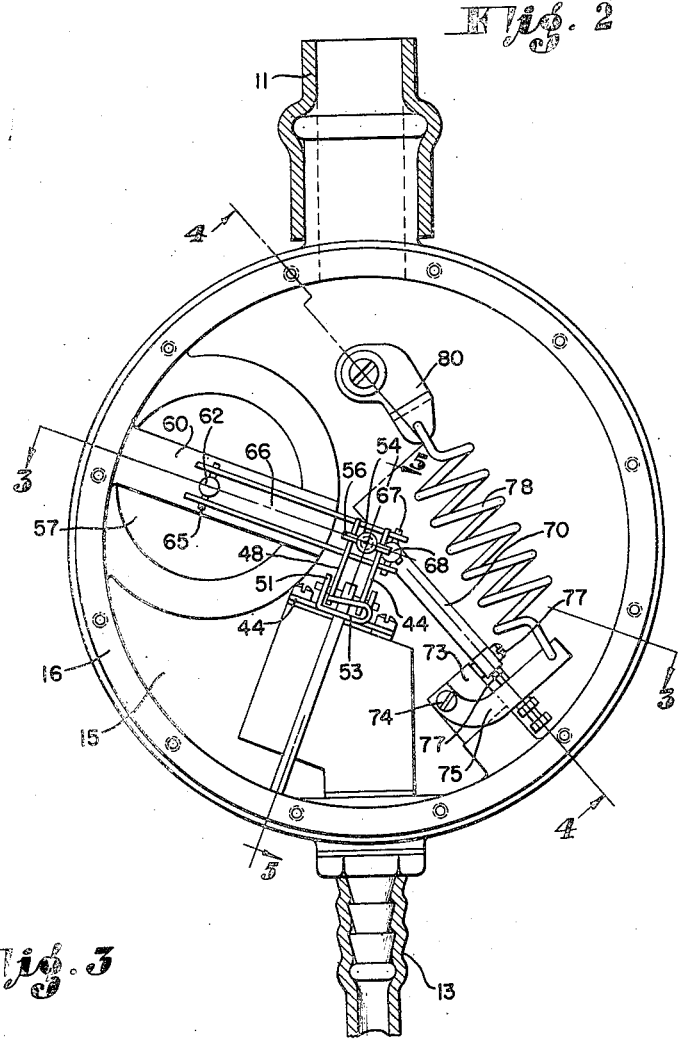
Fig. 2 is an enlarged view, looking toward the back of the regulator shown in Fig. 1, the back cover and diaphragm being removed so as to show the internal parts of the device.

As shown in Fig. 2 and Fig. 7, the oxygen supply tube 13 is connected to an oxygen inlet valve 20 by means of a fitting 21 which projects through an opening 22 in the side wall 16 of the casing 14, the inner end of the fitting 21 being threaded as shown in Fig. 7 so that it will screw into the inlet opening 23 of the valve 20. The inlet opening 23 communicates with a valve chamber 24 having a threaded counterbore 25 at its front end and having at its rear end a wall 26 having an axial opening 27 to receive and guide the stem 28 of a rear valve member 29, and having around the opening 27 a plurality of gas passages 30. Adjacent the rear end wall 26 of the chamber 24 an annular gasket 31 of yieldable material, such as rubber, is held in a shallow recess in a position to be engaged by the valve member 29 when the inlet valve is closed, as shown in Fig. 7. The valve member 29 forms part of a valve assembly or valve proper which includes a front valve member 32 having a shoulder 33 against which an annular gasket 34 is placed, and from which a stem 35 projects forwardly through a valve seat member 36 which is threaded into the counterbore 25 and has a plurality of passages 37 which communicate with the exterior of the body of the inlet valve. In its rear end the valve member 32 has a threaded opening 38 to receive the reduced threaded end 39 of the stem 28, and the valve member 32 has walls or fingers 40 to frictionally engage the forward end of the valve stem 28. A spring 41 urges the valve assembly leftward toward closed position.

The valve seat member 36 has at its rightward end a valve seat 42 which engages the gasket 34 when the oxygen valve is closed. Opening of the valve is accomplished by movement transmitted to the projecting end 43 of the stem 35. The pressure of the oxygen fed into the valve chamber 23 does not affect the pressure required to open the valve for the reason that it has two closures of substantially the same area so that the fluid pressures supplied to the valve are balanced. Also, the oxygen valve is capable of delivering a high rate of flow because of the employment of two valve openings of relatively large size. In assembly of the valve, or thereafter, the spatial relation of the valve members 29 and 32 may be adjusted by rotation of the parts 29 and 32 so as to cause the threaded portion 39 of the valve 29 to move in or out of the threaded opening 38 of the valve member 32.

For opening the oxygen valve a lever 44 is provided as shown in Figs. 5 and 6. This lever 44 is stamped from sheet metal so as to provide a pair of substantially parallel side walls 45 which are connected by a transverse wall 46 positioned so that it may engage the projecting end 43 of the valve stem 35. Above the transverse wall 46 a horizontal pin 47 extends through the upper portions of the side walls 45 to support the lever 44 in such a manner that by downward pressure applied to the projecting ends or fingers 48 of the side walls 45 the lever 44 may be rotated in anticlockwise direction as shown in Fig. 5, thereby causing the transverse wall 46 to apply opening movement to the valve stem projection 43. For adjustment of the valve operating lever 44, an adjustable bracket 48 is provided, this bracket or support 48 having a pair of legs 49 which straddle the valve stem projection 43, and which are engaged at their ends by screws 50 threaded into the valve body 20. This bracket 48 is stamped from sheet metal and has at its upper end forwardly projecting tongues 51 which carry the pin 47. The position of the pin 47 with relation to the valve stem projection 43 may be changed by moving the upper end of the bracket 48, this being accomplished by rotation of an adjusting screw 52, the inner end of which is threaded through the upper folded portion 53 of the bracket 48 and the outer end of which extends to the exterior of the casing 14.

Figure 3:
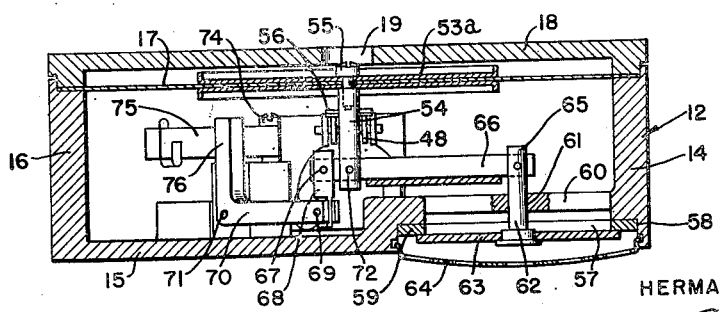
Fig. 3 is a cross-section taken as indicated by the line 3—3 of Fig. 2.

As shown in Fig. 3, stiffening members 53a of circular form are applied to the central portion of the diaphragm 17 and a stem 54 is secured to the central portion of the diaphragm 17 so as to project inwardly therefrom by a screw 55 which passes through the stiffening members 53 and the diaphragm 17. The stem 54 lies between the ends or forks 48 of the lever 44 as shown in Figs. 2 and 3 and a transverse pin 56 is secured in the stem 54 in such position that the projecting ends thereof will engage the parts 48 of the lever 44.

Through the pin 56, inward movement of the diaphragm 17 is transmitted to the lever 44 which in turn will force the valve stem 35 inward to open the oxygen valve.

In the front wall 15 of the casing 14 there is an exhalation valve opening 57 having at its outer end an annular recess 58 to receive a gasket or valve seat 59. Across the opening 57 there is a bar 60 having a central opening 61 to receive and guide the stem 62 of an exhalation valve 63. A perforated cover 64 is positioned across the outer end of the valve opening 57 in spaced relation to the valve 63. The inner end of the stem 62 carries a transverse pin 65 for pivotally connecting it to one end of a fulcrum lever 66 which lies in approximately parallel relation to the diaphragm 17. The opposite end of the lever 66 is connected by means of a pin 67 to a link 68 which is in turn connected by means of a pin 69 with one end of a bell crank lever 70 which swings on a pivot 71.

As shown in Fig. 3, the link 68 lies close to the stem 54 of the diaphragm 17. The inner end of the stem 54 is connected to the fulcrum lever 66 adjacent the pin 67 by a pin 72. It is characteristic of this arrangement that, referring to Fig. 3, when a downward force is applied to the pin 67, the stem 54 of the diaphragm 17 will be pulled downward, and rotation of the fulcrum lever 66 on the pin 72 will move the exhalation valve 63 upward or inward. The lever arms represented by the distance between the pins 65 and 72 and between the pins 67 and 62 are proportioned in inverse ratio to the areas of the diaphragm 17 and the exhalation valve 63 so that the unit gas pressure forces against the inner surfaces of the members 17 and 63 will be substantially equalized at all times.

As shown in Fig. 2, the pivot 71 for supporting the lever 70 is mounted on an abutment 73 formed within the casing 14. This abutment also carries a pivot screw 74 to swingably support a lever 75 disposed in crossing relation to the end 76 of the bell crank lever 70. As shown in Figs. 2 and 4, a screw 77 adjustably carried by the lever 75 engages the end 76 of the bell crank lever 70. A spring 78 has one of its ends connected to the swinging end 79 of the lever 75 and has its other end connected to a lever 80 which, as shown in Fig. 4, is connected to the inner end of a shaft 81 arranged to be rotated by a knob 82 disposed on the front wall 15 of the casing 14. A spring pressed detent member 83 is mounted in the knob 82 so as to engage a series of depressions 84 in the surface of the casing wall 15, to retain the knob 82 and the lever 80 in the different positions thereof accomplished by turning the knob 82, thereby adjusting the tension of the spring 78 and the force which is transmitted through the lever 75 and the bell crank 70 to the short link 68 which serves as a means for applying controlling force to one end of the fulcrum lever 66.

In the schematic view, Fig. 8, the cooperative relation of the levers and the oxygen valve operating means is shown in a single elevation, for the purpose of simplifying the explanation of the operation of the regulator. From Fig. 8, it will be noted that the tension of the spring 78, acting through the lever 75, applies a rotative force to the bell crank 70 as indicated by the arrow 85. This results in the application of the forces F, F2, and F3. Whether or not the force F2 moves the stem 54 of the diaphragm 17 downward depends upon the oxygen pressure within the casing 14, which pressure acts upwardly against the diaphragm 17. If the pressure within the casing 14 drops below the selected value, which is determined by the adjustment of the spring 78, the force F2 moves the stem 54 downward and the pin 56 engages the lever 44 and rotates it so as to force the valve stem 35 inward, thereby opening the oxygen valve so as to feed oxygen under pressure into the chamber of the regulator, to thereby increase the pressure exerted upwardly against the diaphragm 17, whereupon the stem 54 will be moved upward against the action of the force F2 to permit a return of the movable parts of the oxygen valve toward closed position. Accordingly, the reduction in pressure against the diaphragm 17 resulting from inspiration on the part of the user of the device results in feeding of oxygen into the chamber of the casing 14 and through the breathing tube 11 without any great reduction in pressure in the regulator, the breathing tube 11, and the lungs of the user. When the act of expiration takes place, the increase in pressure within the regulator 12 moves the diaphragm 17 upward through the short distance required to bring the rim 87 into engagement with the inner face of the cover 18 so that the pivot pin 72 at the lower end of the stem 54 will be then held rigid or stationary and will thereafter serve as a fulcrum around which the lever 66 may swing so as to permit opening of the exhalation valve 63 in response to a very slight increase in pressure against its inner face. The exhalation valve 63 is in effect a relief valve which is urged toward closed position by a force which varies with the pressure applied to the inner face of the diaphragm 17 in cooperation with and as determined by the tension of the spring 75.

In the regulator 12 the single spring 78 serves as a means for loading both the diaphragm and the exhalation valve to achieve the desired breathing pressures and the proportioning of the lever arms with relation to the areas of these members serves to coordinate their action in the manner hereinbefore described to produce the improved results constituting the objectives of the invention.

I claim as my invention:

1. In an oxygen regulator of the character described, the combination of: walls forming a chamber having an oxygen outlet opening and an exhalation opening, one of the walls of said chamber being movable inwardly, and being movable outwardly a limited distance by changes in pressure differential applied thereto; an oxygen inlet valve connected to the chamber; an exhalation valve for said exhalation opening, said exhalation valve being urged in the opening direction by pressure within said chamber; pressure means for applying a controlling pressure; a leverage system to transmit pressure from said pressure means to said wall and to said exhalation valve to move said wall inwardly and close said exhalation valve; and means operating in response to inward movement of said wall to open said oxygen inlet valve to admit oxygen.

2. In an oxygen regulator of the character described, the combination of: walls forming a chamber having an oxygen outlet opening and an exhalation opening, one of the walls of said chamber comprising a diaphragm of limited flexing characteristics movable inwardly and outwardly by changes in pressure differential applied thereto; an oxygen inlet valve connected to the chamber; an exhalation valve for said exhalation opening, said exhalation valve being urged in the opening direction by pressure within said chamber; pressure means for applying a controlling pressure; a leverage system to transmit pressure from said pressure means to the diaphragm and to said exhalation valve to move said diaphragm inwardly and close said exhalation valve; means operating in response to inward movement of said diaphragm to open said oxygen inlet valve to admit oxygen; and means for varying the pressure which said pressure means exerts.

3. In an oxygen regulator of the character described, the combination of: walls forming a chamber having an oxygen outlet opening and an exhalation opening, one of the walls of said chamber being movable inwardly and outwardly by changes in pressure differential applied thereto; an oxygen inlet valve connected to the chamber; an exhalation valve for said exhalation opening comprising a valve closure extending externally of said exhalation opening; pressure means for applying a controlling pressure; a leverage system to transmit pressure from said pressure means to said wall and to said exhalation valve closure to move said wall and said closure inwardly; and means operating in response to inward movement of said wall to open said oxygen inlet valve to admit oxygen.

4. In an oxygen regulator of the character described, the combination of: walls forming a chamber having an oxygen outlet opening and an exhalation opening, one of the walls of said chamber being movable inwardly, and being movable outwardly a limited amount by changes in pressure differential applied thereto; an oxygen inlet valve connected to the chamber; an exhalation valve for said exhalation opening comprising a valve closure extending externally of said exhalation opening; pressure means for applying a controlling pressure; a leverage system to transmit pressure from said pressure means to said wall and to said exhalation valve closure to move said wall and said closure inwardly; means operating in response to inward movement of said wall to open said oxygen inlet valve to admit oxygen; and means for varying the pressure which said pressure means exerts.

5. In an oxygen regulator of the character described, the combination of: walls forming a chamber having an oxygen outlet opening and an exhalation opening, one of the walls of said chamber being movable inwardly and outwardly by changes in pressure differential applied thereto; an oxygen inlet valve connected to the chamber; an exhalation valve for said exhalation opening comprising a valve closure extending externally of said exhalation opening; pressure means for applying a controlling pressure; a leverage system to transmit pressure from said pressure means to said wall and to said exhalation valve closure in proportion substantially inverse to the ratio of the area of said wall to the area of said closure to move said wall and said closure inwardly; means for limiting movement of a portion of said leverage system transmitting pressure from said pressure means to said wall, said limiting means limiting movement of said leverage system portion in an outwardly direction; and means operating in response to inward movement of said wall to open said oxygen inlet valve to admit oxygen.

6. In an oxygen regulator of the character described, the combination of: walls forming a chamber having an oxygen outlet opening and an exhalation opening, one of the walls of said chamber being movable inwardly and outwardly by changes in pressure differential applied thereto; an oxygen inlet valve connected to the chamber; an exhalation valve for said exhalation opening comprising a valve closure extending externally of said exhalation opening; pressure means for applying a controlling pressure; a leverage system to transmit pressure from said pressure means to said wall and to said exhalation valve closure in proportion substantially inverse to the ratio of the area of said wall to the area of said closure to move said wall and said closure inwardly; means for limiting outward movement of said one wall; means operating in response to inward movement of said wall to open said oxygen inlet valve to admit oxygen; and means for varying the pressure which said pressure means exerts.

7. In an oxygen regulator of the character described, the combination of: walls forming a chamber having an oxygen outlet opening and an exhalation opening and including a wall having limited movement, said wall being movable inwardly and outwardly by changes in pressure differential applied thereto; an oxygen inlet valve connected to the chamber; an outwardly opening exhalation valve for said exhalation opening; pressure means for applying a controlling pressure; a leverage system to transmit pressure from said pressure means to said wall and to said exhalation valve to move said wall inwardly and close said exhalation valve; means operating in response to inward movement of said wall to open said oxygen inlet valve to admit oxygen; and manually adjustable means for varying the pressure which said pressure means exerts.

8. In an oxygen regulator of the character described, the combination of: walls forming a chamber having an oxygen outlet opening and an exhalation opening, one of the walls of said chamber being movable inwardly and outwardly by changes in pressure differential applied thereto; an oxygen inlet valve connected to the chamber; an exhalation valve for said exhalation opening comprising a valve closure extending externally of said exhalation opening; pressure means for applying a controlling pressure; a leverage system to transmit pressure from said pressure means to said wall and to said exhalation valve closure in proportion substantially inverse to the ratio of the area of said wall to the area of said closure to move said wall and said closure inwardly; means for limiting outward movement of said one wall; means operating in response to inward movement of said wall to open said oxygen inlet valve to admit oxygen; and manually adjustable means for varying the pressure which said pressure exerts.

9. In an oxygen regulator of the character described, the combination of: walls forming a chamber having an oxygen outlet opening and an exhalation opening, one of the walls of said chamber being movable inwardly and outwardly by changes in pressure differential applied thereto; an oxygen inlet valve connected to the chamber; an exhalation valve for said exhalation opening; pressure means for applying a controlling pressure; a fulcrum lever connected at spaced points of connection to said wall, said exhalation valve, and said pressure means so as to transmit pressure from said pressure means to said wall and to said exhalation valve to move said wall inwardly and close said exhalation valve, said point of connection of said wall being closer to said point of connection of said pressure means than is said point of connection of said exhalation valve; means for limiting movement of the connection between the fulcrum lever and movable wall in an outwardly direction; and means operating in response to inward movement of said wall to open said oxygen inlet valve to admit oxygen.

10. In an oxygen regulator of the character described, the combination of: walls forming a chamber having an oxygen outlet opening and an exhalation opening, one of the walls of said chamber being movable inwardly and outwardly by changes in pressure differential applied thereto; an oxygen inlet valve connected to the chamber; an exhalation valve for said exhalation opening; pressure means for applying a controlling pressure; a fulcrum lever connected at spaced points of connection to said wall, said exhalation valve, and said pressure means so as to transmit pressure from said pressure means to said wall and to said exhalation valve to move said wall inwardly and close said exhalation valve; means for limiting movement of the connection between the fulcrum lever and movable wall in an outwardly direction; means operating in response to inward movement of said wall to open said oxygen inlet valve to admit oxygen; and means for varying the pressure which said pressure means exerts.

11. In an oxygen regulator of the character described, the combination of: walls forming a chamber having an oxygen outlet opening and an exhalation opening, one of the walls of said chamber being movable inwardly and outwardly by changes in pressure differential applied thereto; an oxygen inlet valve connected to the chamber; an exhalation valve for said exhalation opening comprising a valve closure extending externally of said exhalation opening; pressure means for applying a controlling pressure; a fulcrum lever having the first end thereof connected to said pressure means, having the other end thereof connected to said closure, and having an intermediate point thereof near to said first end connected to said wall so that from said pressure means inwardly acting forces will be transmitted to said closure and said wall substantially in proportion to the areas thereof; means for limiting movement of the connection between the fulcrum lever and movable wall in an outwardly direction; and means for varying the pressure which said pressure means exerts.

12. In an oxygen regulator to meet the respirational requirements of human beings, the combination of: walls forming a chamber having an oxygen opening and an exhalation opening, one of the walls of said chamber being movable inwardly and outwardly by changes in pressure differential applied thereto; means for limiting movement of said wall; a valve controlling said oxygen opening; an exhalation valve for said exhalation opening subjected in the opening direction to chamber pressure; pressure means for applying a controlling pressure; and means interconnecting said pressure means, wall, exhalation valve and oxygen valve, said means being so constructed and arranged that said pressure means tends to move the wall inwardly and to close the exhalation valve, and upon inward movement of said wall said oxygen valve tends to open, and upon outward movement of said wall the oxygen valve tends to close and the exhalation valve tends to open by reason of pressure in said chamber exerted on said exhalation valve.

13. In an oxygen regulator of the character described, the combination of: walls forming a chamber having an oxygen inlet opening and an exhalation opening, one of the walls of said chamber being movable inwardly and outwardly by changes in pressure differential applied thereto; an oxygen inlet valve connected to the chamber; an exhalation valve for said exhalation opening comprising an outwardly opening valve closure; pressure means for applying a controlling pressure; a leverage system for transmitting pressure of said pressure means to said exhalation valve closure to move said closure inwardly; a branch connection included in said leverage system to transmit pressure from said pressure means to said wall for moving said wall inwardly; means operating in response to inward movement of said wall to open said oxygen inlet valve to admit oxygen; and means for limiting the outward movement of said branch connection.

14. In an oxygen regulator of the character described, the combination of: walls forming a chamber having an oxygen outlet opening and an exhalation opening, one of the walls of said chamber being movable inwardly, and being movable outwardly a limited distance by changes in pressure differential applied thereto; an oxygen inlet valve connected to the chamber; an exhalation valve for said exhalation opening; pressure means for applying a controlling pressure; a leverage system to transmit pressure from said pressure means to said wall and to said exhalation valve closure to move said wall and closure inwardly; and means operating in response to inward movement of said wall to open said oxygen inlet valve to admit oxygen.

15. In regulating means: walls forming a chamber having an oxygen outlet opening and an exhalation opening, one of said walls comprising a diaphragm movable inwardly and outwardly by changes in pressure differential applied thereto; an oxygen inlet valve connected to the chamber; an exhalation valve for said exhalation opening, said exhalation valve being urged in the opening direction by pressure within said chamber; pressure means for applying opening pressure; a leverage system to transmit pressure from said pressure means to said diaphragm and to said exhalation valve to move said diaphragm inwardly and close said exhalation valve; and means operating in response to inward movement of said wall to open said oxygen inlet valve to admit oxygen.

HERMAN P. ROTH.

REFERENCES CITED

The following references are of record in the file of this patent:

UNITED STATES PATENTS

| Number | Name | Date |
|---|---|---|
| 1,145,601 | Lemoine | July 6, 1915 |
| 1,564,835 | Drager | Dec. 8, 1925 |

FOREIGN PATENTS

| Number | Country | Date |
|---|---|---|
| 56,626 | Austria | Dec. 10, 1912 |
| 479,341 | Germany | July 15, 1929 |